US012522585B2

(12) United States Patent
Mais et al.

(10) Patent No.: US 12,522,585 B2
(45) Date of Patent: Jan. 13, 2026

(54) METHOD FOR PREPARING 2-CHLORO-N-(1-CYANOCYCLOPROPYL)-5-[2'-METHYL-5'-(PENTAFLUOROETHYL)-4'-(TRIFLUOROMETHYL)-2'H-1,3'-BIPYRAZOL-4-YL]BENZAMIDE

(71) Applicant: VETOQUINOL SA, Magny-Vernois (FR)

(72) Inventors: Franz-Josef Mais, Düsseldorf (DE); Werner Lindner, Cologne (DE); Britta Olenik, Bottrop (DE); Birgit Keil, Düsseldorf (DE); Hildegard Scheithauer, Wülfrath (DE)

(73) Assignee: VETOQUINOL SA, Magny-Vernois (FR)

( * ) Notice: Subject to any disclaimer, the term of this patent is extended or adjusted under 35 U.S.C. 154(b) by 561 days.

(21) Appl. No.: 17/926,535

(22) PCT Filed: May 26, 2021

(86) PCT No.: PCT/EP2021/064095
§ 371 (c)(1),
(2) Date: Nov. 18, 2022

(87) PCT Pub. No.: WO2021/239835
PCT Pub. Date: Dec. 2, 2021

(65) Prior Publication Data
US 2023/0203013 A1    Jun. 29, 2023

(30) Foreign Application Priority Data
May 27, 2020    (EP) .................................... 20176774

(51) Int. Cl.
*C07D 403/04*    (2006.01)
*B01J 27/185*    (2006.01)

(52) U.S. Cl.
CPC ........ *C07D 403/04* (2013.01); *B01J 27/1856* (2013.01); *C07B 2200/13* (2013.01)

(58) Field of Classification Search
CPC . C07D 403/04; B01J 27/1856; C07B 2200/13
See application file for complete search history.

(56) References Cited

U.S. PATENT DOCUMENTS

2015/0353500 A1    12/2015   Maue et al.
2018/0263242 A1*    9/2018   Qacemi et al.

FOREIGN PATENT DOCUMENTS

CN       105073735 A      11/2015
WO     2014122083 A1       8/2014
(Continued)

OTHER PUBLICATIONS

Foreign Communication from a Related Counterpart Application, Chinese First Office Action, Chinese Application No. 202180035472.9 filed on May 26, 2021.
(Continued)

*Primary Examiner* — Brandon J Fetterolf
(74) *Attorney, Agent, or Firm* — Conley Rose, P.C.

(57) ABSTRACT

The present invention relates to a method for preparing 2-chloro-N-(1-cyanocyclopropyl)-5-[2'-methyl-5'-(pentafluoroethyl)-4'-(trifluoromethyl)-2'H-1,3'-bipyrazol-4-yl]benzamide, i.e. the compound of the formula (I) and to a method for purifying the compound of the formula I. The present invention additionally relates to new crystal forms of the compound of the formula I.

(Continued)

(56) References Cited

FOREIGN PATENT DOCUMENTS

Figure 1:
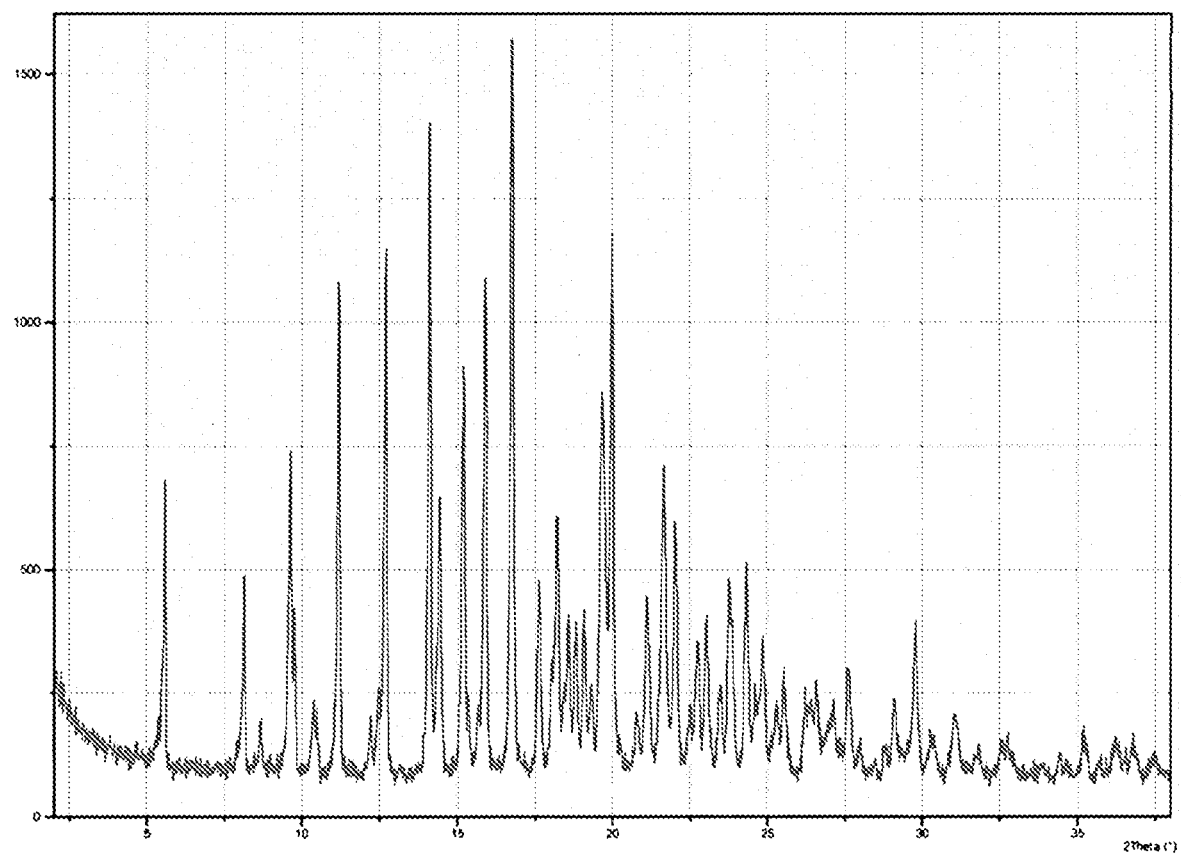
Figure 2:
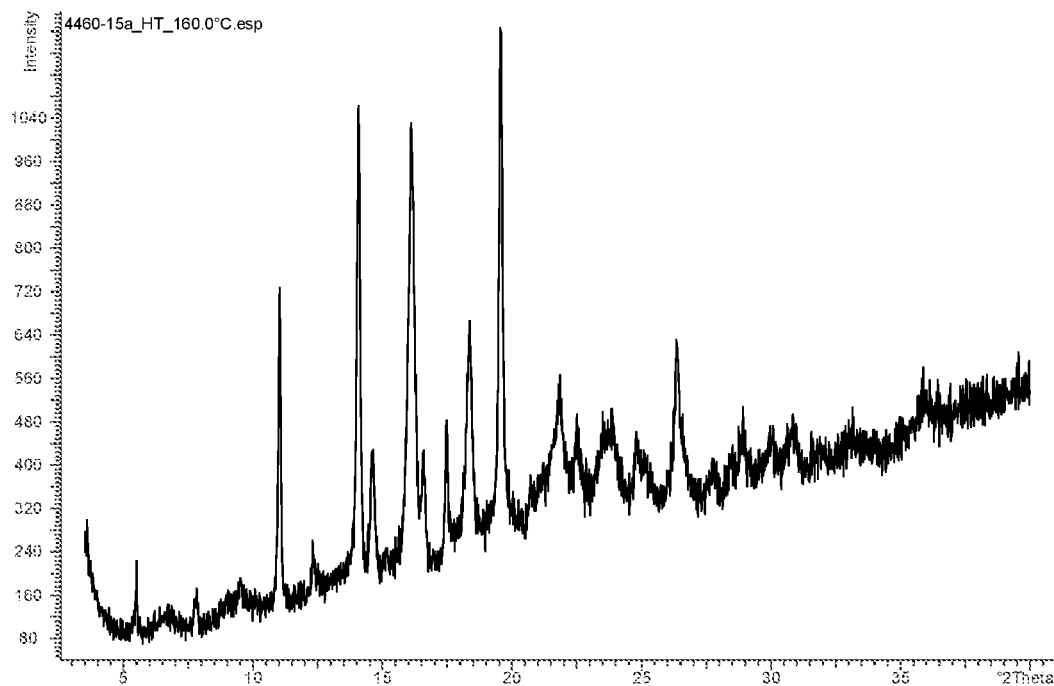
Figure 3:
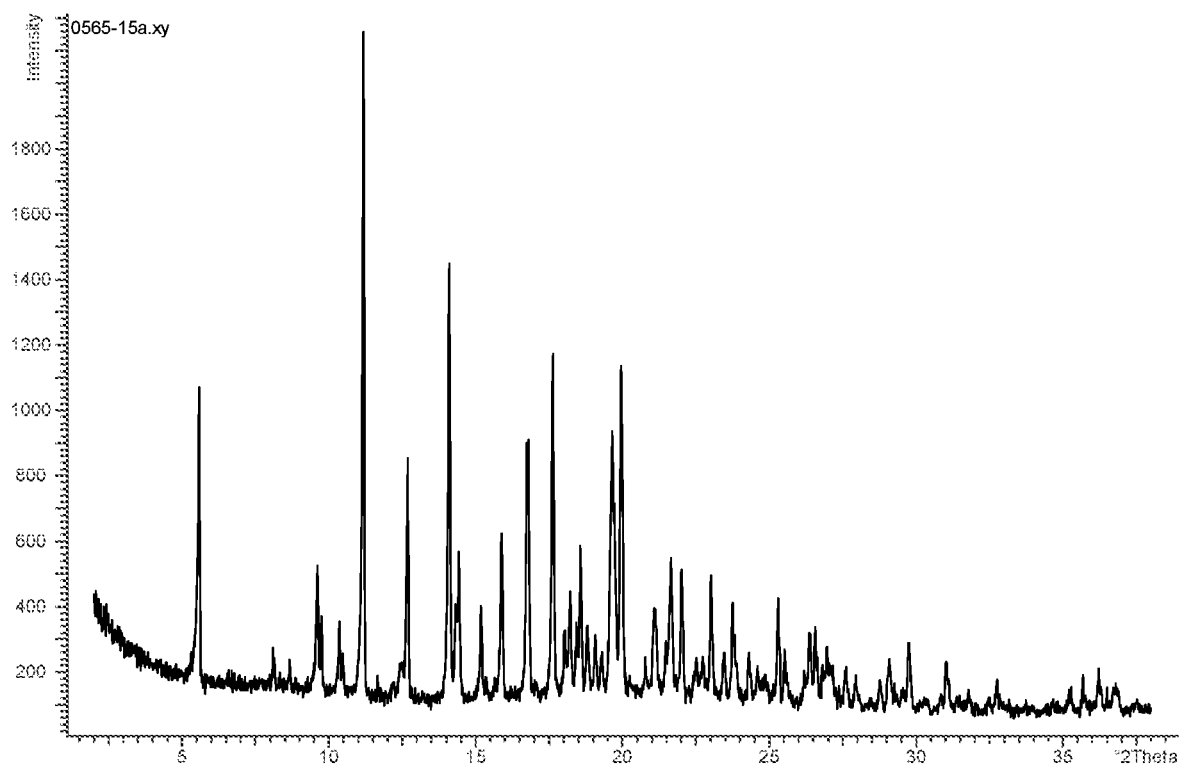
Figure 4:
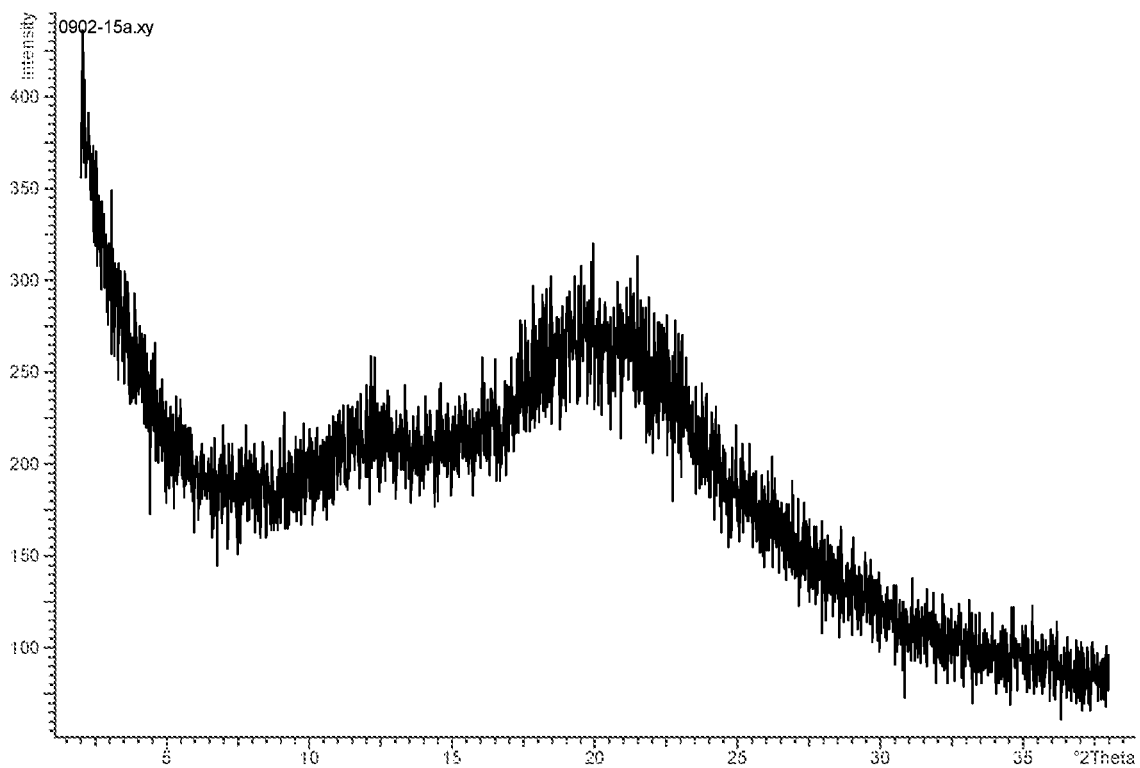

| WO | WO2015/078846 A1 | * | 6/2015 |
| WO | WO2017/012970 A2 | * | 1/2017 |
| WO | 2018177993 A1 | | 10/2018 |
| WO | 2021239835 A1 | | 12/2021 |

OTHER PUBLICATIONS

Foreign Communication from a Related Counterpart Application, International Search Report and Written Opinion dated Jul. 29, 2021, International Application No. PCT/EP2021/064095 filed on May 26, 2021.
Byrn, et al., Pharmaceutical Research, "Pharmaceutical Solids: A Strategic Approach to Regulatory Considerations", vol. 12, No. 7, 1995, pp. 945-954.
Caira, "Crystalline Polymorphism of Organic Compounds" Topics in Current Chemistry, vol. 198, 1998, pp. 163-208.

* cited by examiner

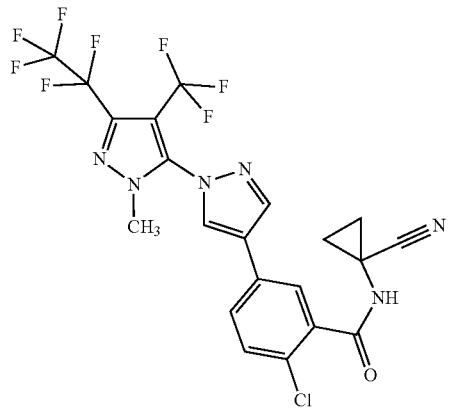

(I)

13 Claims, 4 Drawing Sheets

METHOD FOR PREPARING 2-CHLORO-N-(1-CYANOCYCLOPROPYL)-5-[2'-METHYL-5'-(PENTAFLUOROETHYL)-4'-(TRIFLUOROMETHYL)-2'H-1,3'-BIPYRAZOL-4-YL]BENZAMIDE

CROSS-REFERENCE TO RELATED APPLICATIONS

The present application is a filing under 35 U.S.C. 371 as the National Stage of International Application No. PCT/EP2021/064095, filed May 26, 2021, entitled "Method for preparing 2-chloro-n-(1-cyanocyclopropyl)-5-[2'-methyl-5'-(pentafluoroethyl)-4'-(trifluoromethyl)-2'h-1,3'-bipyrazol-4-yl]benzamide," which claims priority to European Application No. 20176774.6 filed with the Intellectual Property Office of Europe on May 27, 2020, both of which are incorporated herein by reference in their entirety for all purposes.

The present invention relates to a method for preparing 2-chloro-N-(1-cyanocyclopropyl)-5-[2'-methyl-5'-(pentafluoroethyl)-4'-(trifluoromethyl)-2'H-1,3'-bipyrazol-4-yl]benzamide, i.e. the compound of the formula (I) and to a method for purifying the compound of the formula I. The present invention additionally relates to new crystal forms of the compound of the formula I.

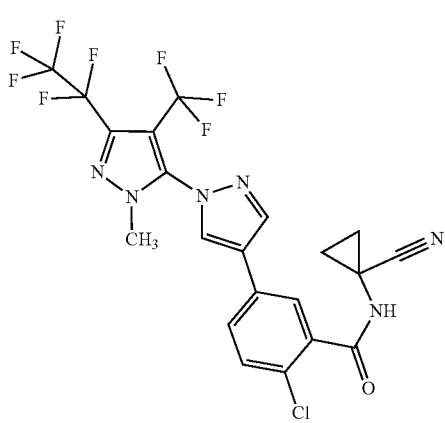

(I)

The compound of the formula (I) has the INN tigolaner. The compound is disclosed in WO 2014/122083; also described therein is the preparation of the compound of the formula I by a Pd-catalysed coupling of suitable structural units. As regards methods of purification, a purification by column chromatography on silica gel is described for two comparable compounds.

WO 2015/078846, WO 2015/078847, WO 2015/181139 and WO 2016/026789 disclose the preparation of the compound of the formula I according to the reaction equation below.

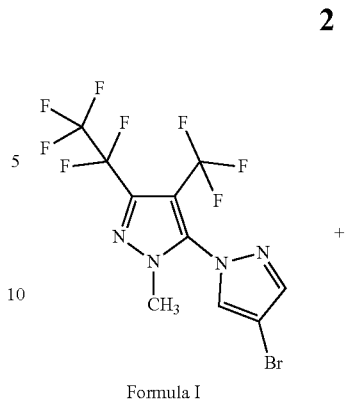

Formula I

Formula II

Formula III

A drawback of the synthesis described in the examples in these patents is the low overall yield of only approx. 49% of theory after purification. The described method of purification is purification by column chromatography on silica gel.

A further drawback is that, according to the examples in patents WO 2015/078846, WO 2015/078847, WO 2015/181139 and WO 2016/026789, the structural unit of the formula II prepared according to the reaction equation below Formula IV Formula V

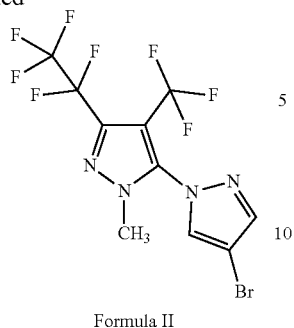

Formula II is obtained in a yield of only approx. 24% of theory. The high purchase price of the highly fluorinated raw material of the formula IV means this is very unfavourable for commercial production.

The object was therefore to find a simplified method with improved yields for the compound of the formula I that can be advantageously executed reliably and also on an industrial scale and that affords an active substance of high purity.

A method has now been developed for preparing the compound of the formula (I)

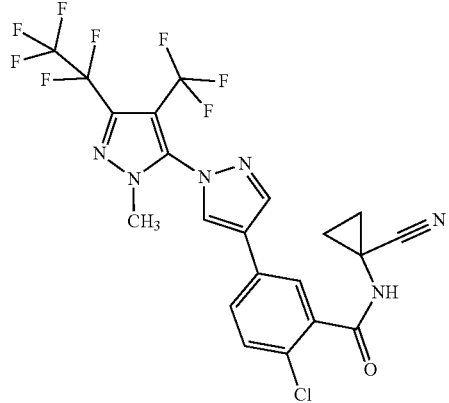

(I)

by reacting compounds of the formula (VI)

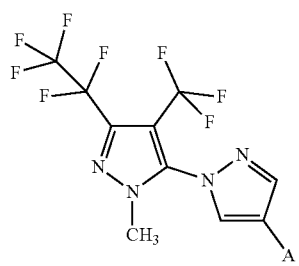

(VI)

where
A is a boron-containing substituent selected from:
a boronic acid radical of the formula

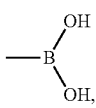

a trifluoroborate of the formula

—BF$_3$M, where M is an alkali metal salt, preferably sodium or potassium,
and a boronic ester of the formula

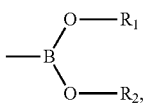

where $R^1$ and $R^2$ are independently $C_1$-$C_6$ alkyl or $C_3$-$C_6$ cycloalkyl, or $R^1$ and $R^2$ together form a $C_1$-$C_6$ alkylene group optionally substituted by one or more $C_1$-$C_4$ alkyl groups, with compounds of the formula (VII)

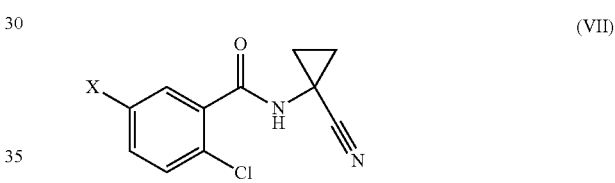

(VII)

where X is a reactive group selected from: bromine, iodine and the radical —O—SO$_2$—Y, where Y is $C_1$-$C_8$ perfluoroalkyl,
in the presence of a base and a catalyst.

In a further aspect, the invention relates to: A method for purifying the compound of the formula I, wherein this is crystallized from an aromatic hydrocarbon.

The reactive group A is preferably a boronic acid or boronic ester, more preferably a boronic ester.

$R^1$ and $R^2$ preferably together form a $C_1$-$C_6$ alkylene group, more preferably a $C_1$-$C_4$ alkylene group. The alkylene group formed from $R^1$ and $R^2$ may preferably be substituted with one or two $C_1$-$C_2$ alkyl groups. More particularly, $R^1$ and $R^2$ together form a group of the formula —C(CH$_3$)$_2$—C(CH$_3$)$_2$— or —CH$_2$—C(H)(CH$_3$)—CH$_2$—.

The reactive group —X is according to the invention bromine, iodine or —O—SO$_2$—Y, where the radical —Y is $C_1$-$C_8$ perfluoroalkyl, preferably straight-chain $C_1$-$C_4$ perfluoroalkyl, more preferably trifluoromethyl, pentafluoroethyl or nonafluorobutyl. X is according to the invention bromine or iodine.

The term "$C_1$-$C_6$ alkyl" refers to a straight-chain or branched, saturated monovalent hydrocarbon group having 1, 2, 3, 4, 5 or 6 carbon atoms, e.g. a methyl, ethyl, propyl, isopropyl, butyl, sec-butyl, isobutyl, tert-butyl, pentyl, isopentyl, 2-methylbutyl, 1-methylbutyl, 1-ethylpropyl, 1,2-dimethylpropyl, neopentyl, 1,1-dimethylpropyl, hexyl, 1-methylpentyl, 2-methylpentyl, 3-methylpentyl, 4-methylpentyl, 1-ethylbutyl, 2-ethylbutyl, 1,1-dimethylbutyl, 2,2-dimethylbutyl, 3,3-dimethylbutyl, 2,3-dimethylbutyl, 1,2- dimethylbutyl or 1,3-dimethylbutyl group or an isomer thereof. The group more particularly has 1, 2, 3 or 4 carbon atoms ("C$_1$-C$_4$ alkyl"), e.g. a methyl, ethyl, propyl, isopropyl, butyl, sec-butyl, isobutyl or tert-butyl group, more particularly 1, 2 or 3 carbon atoms ("C$_1$-C$_3$ alkyl"), e.g. a methyl, ethyl, n-propyl or isopropyl group.

The term "C$_3$-C$_6$ cycloalkyl" refers to a saturated monovalent mono- or bicyclic hydrocarbon ring having 3, 4, 5 or 6 carbon atoms. The C$_3$-C$_6$ cycloalkyl group is for example a monocyclic hydrocarbon ring, e.g. a cyclopropyl, cyclobutyl, cyclopentyl or cyclohexyl group or a bicyclic hydrocarbon ring. The cycloalkyl ring may optionally have one or more double bonds, for example in a cycloalkenyl group, such as a cyclobutenyl, cyclopentenyl or cyclohexenyl group, these double-bond-containing cycloalkyl groups being attached to the rest of the molecule via any desired carbon atom, saturated or unsaturated.

The term "alkylene" preferably refers to a hydrocarbon chain having 1, 2, 3, 4, 5, 6, 7 or 8 carbon atoms, said chain having two bonds to the rest of the molecule or parts thereof, and which may itself be singly or multiply substituted by C$_1$-C$_4$ alkyl, such as the following groups: —CH$_2$— ("methylene"); e.g. —C(CH$_3$)$_2$—), —CH$_2$—CH$_2$— ("ethylene", "dimethylene"), e.g. —C(CH$_3$)$_2$—C(CH$_3$)$_2$—), —CH$_2$—CH$_2$—CH$_2$— ("propylene", "trimethylene"), e.g. —CH$_2$—C(H)(CH$_3$)—CH$_2$—, —CH$_2$—C(CH$_3$)$_2$—CH$_2$—), —CH$_2$—CH$_2$—CH$_2$—CH$_2$— ("butylene", "tetramethylene"), —CH$_2$—CH$_2$—CH$_2$—CH$_2$—CH$_2$— ("pentylene", "pentamethylene"), or —CH$_2$—CH$_2$—CH$_2$—CH$_2$—CH$_2$—CH$_2$— ("hexylene", "hexamethylene"). Preference is given to alkylene chains having 1, 2, 3, 4 or 5 carbon atoms, more particularly 1 or 2 carbon atoms.

The compound of the formula VI is used in amounts of 0.7 to 1.3 equivalents based on the structural unit of the formula VII, preferably 0.9 to 1.1 molar equivalents, more preferably 0.95 to 1.05 molar equivalents.

The compound of the formula VI can be prepared by reaction of a highly fluorinated pyrazole of the

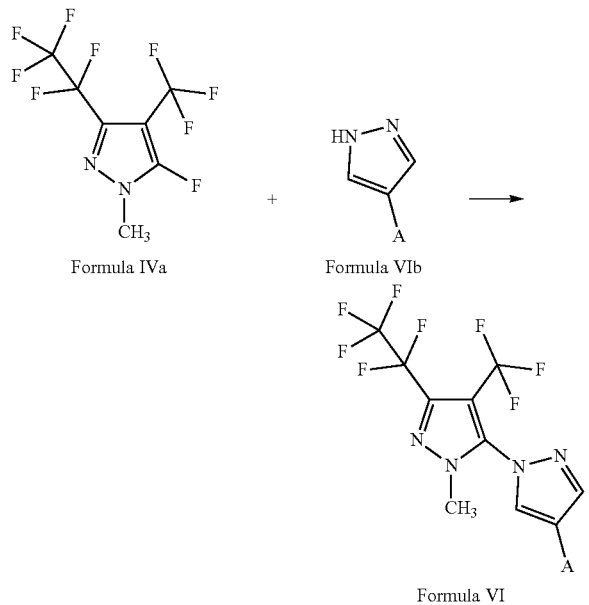

Formula VI

Formula VIa with a boron-substituted pyrazole of the formula VIb, where the substituent A is as defined herein for compounds of the formula VI. The preparation of the compound of the formula VIa is disclosed in WO 2014/012975, WO 2015/078846, WO 2015/078847, WO 2015/181139 and WO 2016/026789. Compounds of the type of formula VIb are obtainable in the chemical trade.

The compound of the formula VII can be prepared by methods known per se, e.g. by the reaction of an acid chloride of the formula VIIa

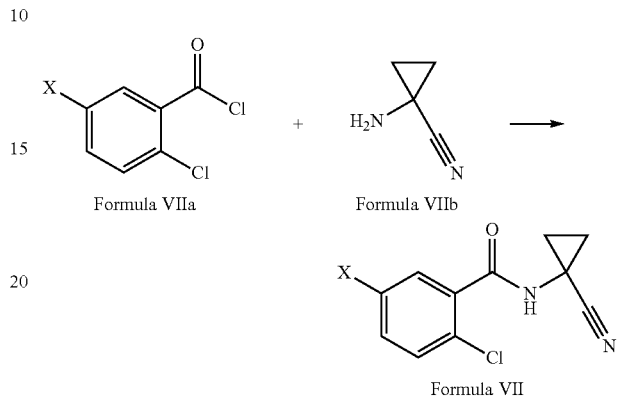

Formula VII with an amine of the formula VIIb. In formula VIIa, the substituent X is as defined herein for compounds of the formula VII. The amine of the formula VIIb may also be used in the form of a salt, e.g. hydrochloride, hydrobromide, hydrogen sulfate or sulfate, in which case additional base may be added to neutralize the acid forming the salt. The acid chloride can be prepared by methods known per se, by reaction of the parent carboxylic acid, by reaction with e.g. thionyl chloride or oxalyl chloride. The parent carboxylic acids are commercially available. The amine of the formula VIIb is commercially available in the form of its salts.

The reaction according to the invention for the preparation of compounds of the formula (I) is carried out in an industrially customary solvent such as dimethylformamide, dimethylacetamide, N-methylpyrrolidone, open-chain or cyclic ethers, preferably having 4 to 8 carbon atoms, e.g. dimethoxyethane, diethoxyethane, dioxane or THF or in C$_1$-C$_6$ alkyl-derived alcohols, e.g. methanol, ethanol, propanol, butanol, pentanol, isopropanol, 2-butanol, tert-butanol, isoamyl alcohol, etc, preferably in C$_1$-C$_4$ alkyl-derived alcohols, e.g. methanol, ethanol, propanol, butanol, isopropanol or 2-butanol. Of the abovementioned solvents, preference is given to those that are miscible with water. It is also possible to use mixtures of the abovementioned solvents. Particular preference is given to aliphatic alcohols having 1 to 4 carbon atoms, in particular ethanol, propanol or isopropanol.

Water may also be used as an additional solvent. The proportion of water based on the solvent or solvent mixture used is usually not more than 80% by weight, preferably not more than 50% by weight, more preferably not more than 30% by weight; usual ranges are 1% to 80% by weight, preferably 5% to 50% by weight, more preferably 10% to 30% by weight.

The reaction according to the invention is carried out in the presence of a base. Suitable bases are the alkali metal or alkaline earth metal carbonates and hydrogen carbonates, such as lithium carbonate, sodium carbonate, potassium carbonate, caesium carbonate, magnesium carbonate, lithium hydrogen carbonate, sodium hydrogen carbonate, potassium hydrogen carbonate, or alkali metal phosphates or hydrogen diphosphates, such as lithium phosphate, sodium phosphate, potassium phosphate, sodium hydrogen diphosphate, potassium dihydrogen phosphate, or alkali metal fluorides, such as sodium fluoride, potassium fluoride or caesium fluoride. Preference is given to sodium carbonate, potassium carbonate, sodium hydrogen carbonate, potassium hydrogen carbonate, sodium phosphate, potassium phosphate, sodium hydrogen diphosphate, potassium dihydrogen phosphate, sodium fluoride or potassium fluoride. It is also possible to use mixtures of the recited bases. Particular preference as bases is given to alkali metal carbonates and alkali metal hydrogen carbonates, in particular sodium carbonate, potassium carbonate, sodium hydrogen carbonate or potassium hydrogen carbonate.

The employed amount of the recited bases is according to the invention 1 to 10 equivalents based on the starting material of the formula VI, preferably 2 to 5 equivalents and more preferably 2.5 to 3.5 equivalents.

The reaction according to the invention is carried out in the presence of a catalyst. The catalysts used are usually palladium compounds. In addition to a palladium-containing component, a phosphorus-containing component may optionally also be used.

Palladium-containing components that may be used for the reaction according to the invention are generally known to those skilled in the art and described in very large number in the general chemical literature. It is possible to list below only selected examples.

The palladium-containing components that may be used are salts or complexes of palladium such as $Pd(OAc)_2$, $PdCl_2$, $Pd_2(dba)_3$ (tris(dibenzylideneacetone)dipalladium (0)), $Pd(dba)_2$ (bis(dibenzylideneacetone)palladium(0)), $PdCl_2(PPh_3)_2$ (dichlorobis(triphenylphosphine)palladium (II)), $PdCl(PPh_3)_3$ (chlorotris(triphenylphosphine)palladium (I)), $Pd(PPh_3)_4$ (tetrakis(triphenylphosphine)palladium(0)), $PdCl_2(dppf)$ (1,1'-bis(diphenylphosphino)ferrocenepalladium(II) dichloride), $PdCl_2(dppf)$ dichloromethane complex and $PdCl_2(amphos)_2$ (bis(di-tert-butyl(4-dimethylaminophenyl)phosphine)dichloropalladium(II)), etc.

Phosphorus-containing components that may be used for the reaction according to the invention are generally known to those skilled in the art and described in very large number in the general chemical literature. It is possible to list below only selected examples.

Phosphorus-containing components that may be used are triphenylphosphine, tris(o-tolyl)phosphine, tris(2-furyl) phosphine, dppp (1,3-bis(diphenylphosphino)propane), dppb (1,3-bis(diphenylphosphino)butane), dppf (1,1'-bis(diphenylphosphino)ferrocene), X-Phos (2-dicyclohexylphosphino-2',4',6'-triisopropylbiphenyl), S-Phos (2-dicyclohexylphosphino-2',6'-dimethoxybiphenyl), Dave-Phos (2-dicyclohexylphosphino-2'-(N,N-dimethylamino)biphenyl), amphos (di-tert-butyl(4-dimethylaminophenyl)phosphine), etc.

When the palladium-containing components do not themselves contain any phosphorus-containing ligands, mixtures of the palladium-containing component and a phosphorus-containing component are according to the invention used. For example, the palladium-containing components $Pd(OAc)_2$, $PdCl_2$, $Pd_2(dba)_3$, $Pd(dba)_2$, etc. are used in a mixture with the abovementioned phosphorus-containing components. Palladium-containing components that already contain phosphorus-containing components may be used without additional phosphorus-containing components. It is however also possible to use palladium-containing components that already contain phosphorus-containing ligands in a mixture with phosphorus-containing components.

It is also possible to use mixtures of different palladium salts and different palladium complexes and different phosphorus-containing ligands.

Preference is according to the invention given to using $Pd(OAc)_2$, $PdCl_2$, $Pd_2(dba)_3$, $Pd(dba)_2$ with triphenylphosphine, tris(o-tolyl)phosphine, tris(2-furyl)phosphine, dppp (1,3-bis(diphenylphosphino)propane), dppb (1,3-bis(diphenylphosphino)butane), dppf (1,1'-bis(diphenylphosphino) ferrocene), X-Phos (2-dicyclohexylphosphino-2',4',6'-triisopropylbiphenyl), S-Phos (2-dicyclohexylphosphino-2',6'-dimethoxybiphenyl), Dave-Phos (2-dicyclohexylphosphino-2'-(N,N-dimethylamino)biphenyl), amphos (di-tert-butyl(4-dimethylaminophenyl)phosphine), preferably triphenylphosphine, dppf (1,1'-bis(diphenylphosphino)ferrocene), X-Phos (2-dicyclohexylphosphino-2',4',6'-triisopropylbiphenyl), S-Phos (2-dicyclohexylphosphino-2',6'-dimethoxybiphenyl), more preferably triphenylphosphine, dppf (1,1'-bis(diphenylphosphino)ferrocene) as the phosphorus-containing component.

Preference is according to the invention likewise given to using $PdCl_2(PPh_3)_2$ (dichlorobis(triphenylphosphine)palladium(II)), $PdCl(PPh_3)_3$ (chlorotris(triphenylphosphine)palladium(I)), $Pd(PPh_3)_4$ (tetrakis(triphenylphosphine)palladium(0)), $PdCl_2(dppf)$ (1,1'-bis(diphenylphosphino) ferrocenepalladium(II) dichloride), $PdCl_2(dppf)$ dichloromethane complex, likewise more preferably $PdCl_2(PPh_3)_2$ (dichlorobis(triphenylphosphine)palladium(II)) or $Pd(PPh_3)_4$.

When using $Pd(PPh_3)_4$, preference is according to the invention likewise given to additionally adding the phosphorus-containing component triphenylphosphine.

The amount of palladium-containing component used may according to the invention be 0.01 to 10 mol % based on the starting material of the formula VI, preferably 0.1 to 2.5 mol %, more preferably 0.50 to 1 mol %.

The applied catalyst amount of phosphorus-containing component used may according to the invention be 0.025 to 25 mol % based on the starting material of the formula VI, preferably 0.5 to 10 mol %, more preferably 2 to 5 mol %.

The reaction can be carried out from room temperature up to the boiling point of the solvent mixture used. The reaction temperature is usually within a range from 20 to 150° C., preferably 50 to 100° C.

After the reaction, the reaction mixture can be processed in an industrially customary manner. For example, undissolved inorganic salts can be filtered off or—in the case of solvents sparingly soluble in water—removed by washing with water, optionally with addition of salts to the wash water.

The product of the formula I can be precipitated from the reaction mixture by adding water or a suitable solvent. After precipitation, the product can be filtered off and either processed further damp or dried.

Isolation of the product of the formula I by evaporating off the solvent is likewise possible in principle.

The product of the formula I obtained in the usual manner described above can be purified further.

In one aspect of this invention, the product of the formula I can be purified in a further step by crystallizing from an aromatic hydrocarbon and can specifically be purified by precipitation or recrystallization from the aromatic hydrocarbon.

The aromatic hydrocarbon used may be benzene derivatives such as toluene, ethylbenzene, ortho-xylene, meta-xylene, para-xylene, cumene or mesitylene, preferably toluene, ethylbenzene, ortho-xylene, meta-xylene, para-xylene, more preferably toluene. It is also possible to use mixtures of the abovementioned solvents.

In the purification step, the aromatic hydrocarbon or hydrocarbon mixture is used in an amount from 100% to 2000% by weight based on the crude product of the formula I to be purified, preferably 200% to 1000% by weight.

Adding activated carbon during purification by recrystallization is likewise possible.

The amount of activated carbon is usually up to 10% by weight based on the crude product of the formula I to be purified, preferably up to 5% by weight. Adding activated carbon during purification is preferable.

The activated carbon added is removed from the mixture by filtration before crystallization of the pure product. In one embodiment, the activated-carbon-containing mixture is filtered hot, wherein the product crystallizes out during cooling. In another embodiment, an additional solvent in which the crude product has higher solubility may be added in order to prevent the pure product from crystallizing out prematurely and being filtered off with the activated carbon, thereby resulting in a loss in yield. Examples of such solvents include dichloromethane, methanol, ethanol, propanol, isopropanol, acetone or 2-butanone. After the filtration, this additional solvent is removed by distillation and the crystallization takes place from a distillation residue that largely comprises only the aromatic hydrocarbon as solvent. Preference is given to using as the additional solvent acetone and 2-butanone, more preferably acetone.

The amount of the additional solvent based on the amount of aromatic hydrocarbon used is 10% to 200% by weight, preferably 20% to 100% by weight, more preferably 30% to 70% by weight.

To achieve complete precipitation, isolation of the purified solid of the formula I is preceded by cooling to within a temperature range of 0-35° C., preferably to a standard temperature of e.g. 20-30° C.

The product can be isolated in standard manner, for example with the aid of customary isolation apparatus such as a suction filter or centrifuge. To remove the mother liquor, during isolation the product can be washed with a pharmaceutically acceptable solvent, which is preferably the same solvent as previously. The product thus obtained can then be dried.

The method according to the invention offers distinct advantages over the prior art. A particular surprise was that the novel inventive conversion of the structural units of the formula VI and formula VII afforded a substantial increase in yield by comparison with the prior art.

The compound of the formula I can be purified according to a novel method, preferably with aromatic hydrocarbons. This step can follow on from the method for preparing the compounds of the formula I described herein. This purification step allows a very high degree of purity to be achieved even without the use of chromatographic purification. What is surprising is that a highly pure product can be obtained merely by purification by means of precipitation, recrystallization or a combination of the two. This permits the achievement of an active substance purity suitable e.g. for use in veterinary medicaments, since low residual contents of organic secondary components and palladium can be achieved.

The following secondary components may be specifically mentioned here by way of example:

The amide N1:

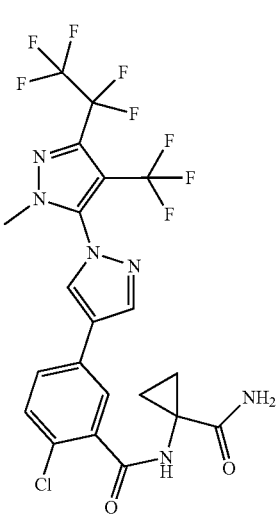

N1

The deschloro compound N2:

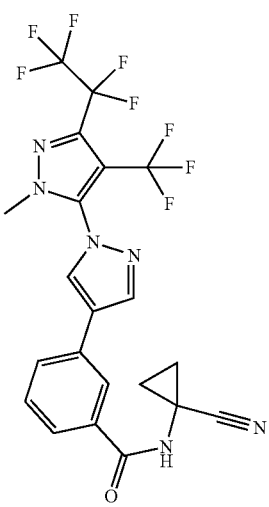

N2

The bispyrazoloboronic ester N3 (compound of the formula VI where -A is 4,4,5,5-tetramethyl-1,3,2-dioxaborolan-2-yl):

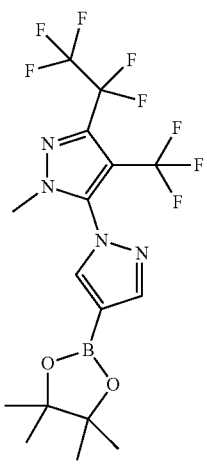

The bispyrazoloboronic acid N4:

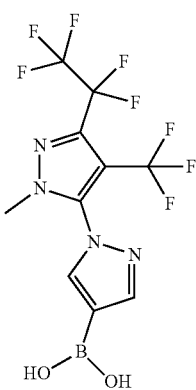

The chloroiodobenzamide N5 (compound of the formula VII where X=I):

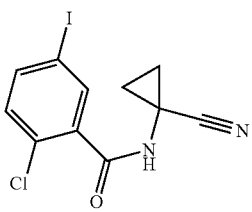

The content of these secondary components in the end product should in each case preferably be less than 2% by weight, more preferably less than 1% by weight, particularly preferably less than 0.7% by weight, in particular less than 0.5% by weight. In the case of the secondary components N3, N4 and N5, the content in the end product should be very particularly preferably less than 0.2% by weight.

A low palladium content in the end product is additionally desirable. This should be less than 100 ppm (w/w), preferably less than 50 ppm (w/w), more preferably less than 20 ppm (w/w).

The sum of all impurities in the end product should be less than 5% by weight, preferably less than 3% by weight, more preferably less than 2.0% by weight.

The method is technically reliable in its execution and allows production on a commercial scale.

Novel crystal forms of the compound of the formula (I) were found, specifically modification I, modification II and an ethanol-water inclusion complex. The compound of the formula (I) may also be present in amorphous form.

The terms modification, polymorph and polymorphic form have the same meaning in the context of this application. In addition to polymorphs, the term "crystal forms" also encompasses pseudopolymorphic forms such as crystalline solvates. Polymorphs, pseudopolymorphic forms and the amorphous form are different solid forms of the compound of the formula (I):

Modification I of the compound of the formula (I) is the thermodynamically stable form at room temperature. It is a stable, non-hygroscopic, easily prepared, easily handled crystal form.

Modification I is therefore suitable for use in the pharmaceutical sector (including in veterinary medicine), in particular for the production of medicaments, preferably for the production of medicaments for animals. The use of modification I prevents undesired transformations into other forms of the compound of the formula (I). This contributes to the quality and safety of formulations and medicaments comprising the compound of the formula (I).

In one embodiment, medicaments according to the invention comprise the compound of the formula (I) in modification I and also optionally further pharmaceutically usable excipients.

In a preferred embodiment, a medicament comprises essentially modification I and no significant proportions of other forms of the compound of the formula (I) and also optionally further pharmaceutically usable excipients.

In medicaments comprising modification I there is preferably at least 85% by weight, particularly preferably at least 90% by weight, very particularly preferably at least 95% by weight, of the compound of the formula (I) in the form of modification I used in a medicament, said percentages being based on the total amount of the compound of the formula (I) in the medicament concerned.

Modification I of the compound of the formula (I) is inter alia characterized by its X-ray powder diffractogram and IR spectrum and can be distinguished from other forms of the compound (see Tables 1 and 2 and FIGS. 1 and 2-8).

Modification I of the compound of the formula (I) can be prepared by crystallization from various solvents and specifically, in particular, diisopropyl ether, toluene, tetrahydrofuran, 1,4-dioxane, acetone, ethyl acetate, acetonitrile, isopropanol, ethanol or methanol.

Modification II can be prepared by crystallization from solketal (isopropylideneglycerol).

The ethanol-water inclusion complex can be obtained by crystallization from a 1:1 mixture of ethanol and water.

The usual procedure for the crystallization is to dissolve the compound of the formula (I) in hot solvent and then cool to room temperature. If this does not result in precipitation, the solution can be cooled to lower temperatures or concentrated.

Modification I of the compound of the formula (I) has useful pharmacological properties and can be used in particular for the treatment of animals. Modification I of the compound of the formula (I) is suitable in particular for use in the control of parasites, in particular ectoparasites, in animals.

In the field of animal health, i.e. the field of veterinary medicine, the crystal forms described herein, in particular modification I of the compound of the formula (I), are used for the control of parasite infestations in animals, in particular ectoparasite infestations. Ectoparasites are typically and preferably arthropods, in particular insects such as flies (blood-sucking flies and flies with sponging mouthparts, such as pasture flies, stable flies, horseflies, or other bothersome or irritating flies such as Musca autumnalis, Musca domestica), parasitic fly larvae (for example botflies, warble flies, blowfly larvae), sucking lice, biting lice, bird lice, fleas and the like; or arachnids (Acari) such as ticks, for example hard ticks or soft ticks, or mites such as mange mites, harvest mites, poultry mites and the like.

Parasites, in particular ectoparasites, include for example the following insects and Acari.

From the order Anoplura, e.g. Haematopinus spp., Linognathus spp., Pediculus spp., Pthirus spp. and Solenopotes spp., the following merit specific mention: Linognathus setosus, Linognathus vituli, Linognathus ovillus, Linognathus oviformis, Linognathus pedalis, Linognathus stenopsis, Haematopinus asini macrocephalus, Haematopinus eurysternus, Haematopinus suis, Pediculus humanus capitis, Pediculus humanus corporis, Phylloxera vastatrix, Pthirus pubis, Solenopotes capillatus;

from the order Mallophaga and the suborders Amblycera and Ischnocera, e.g. Trimenopon spp., Menopon spp., Trinoton spp., Bovicola spp., Werneckiella spp., Lepikentron spp., Damalinia spp., Trichodectes spp. and Felicola spp., the following merit specific mention: Bovicola bovis, Bovicola ovis, Bovicola limbata, Damalinia bovis, Trichodectes canis, Felicola subrostratus, Bovicola caprae, Lepikentron ovis, Werneckiella equi;

from the order Diptera and the suborders Nematocera and Brachycera, e.g. Aedes spp., Anopheles spp., Culex spp., Simulium spp., Eusimulium spp., Phlebotomus spp., Lutzomyia spp., Culicoides spp., Chrysops spp., Odagmia spp., Wilhelmina spp., Hybomitra spp., Atylotus spp., Tabanus spp., Haematopota spp., Philipomyia spp., Braula spp., Musca spp., Hydrotaea spp., Stomoxys spp., Haematobia spp., Morellia spp., Fannia spp., Glossina spp., Calliphora spp., Lucilia spp., Chrysomya spp., Wohlfahrtia spp., Sarcophaga spp., Oestrus spp., Hypoderma spp., Gasterophilus spp., Hippobosca spp., Lipoptena spp., Melophagus spp., Rhinoestrus spp., Tipula spp., the following merit specific mention: Aedes aegypti, Aedes albopictus, Aedes taeniorhynchus, Anopheles gambiae, Anopheles maculipennis, Calliphora erythrocephala, Chrysozona pluvialis, Culex quinquefasciatus, Culex pipiens, Culex tarsalis, Fannia canicularis, Sarcophaga carnaria, Stomoxys calcitrans, Tipula paludosa, Lucilia cuprina, Lucilia sericata, Simulium reptans, Phlebotomus papatasi, Phlebotomus longipalpis, Odagmia ornata, Wilhelmina equina, Boophthora erythrocephala, Tabanus bromius, Tabanus spodopterus, Tabanus atratus, Tabanus sudeticus, Hybomitra ciurea, Chrysops caecutiens, Chrysops relictus, Haematopota pluvialis, Haematopota italica, Musca autumnalis, Musca domestica, Haematobia irritans irritans, Haematobia irritans exigua, Haematobia stimulans, Hydrotaea irritans, Hydrotaea albipuncta, Chrysomya chloropyga, Chrysomya bezziana, Oestrus ovis, Hypoderma bovis, Hypoderma lineatum, Przhevalskiana silenus, Dermatobia hominis, Melophagus ovinus, Lipoptena capreoli, Lipoptena cervi, Hippobosca variegata, Hippobosca equina, Gasterophilus intestinalis, Gasterophilus haemorroidalis, Gasterophilus inermis, Gasterophilus nasalis, Gasterophilus nigricornis, Gasterophilus pecorum, Braula coeca;

from the order Siphonaptera, e.g. Pulex spp., Ctenocephalides spp., Tunga spp., Xenopsylla spp., Ceratophyllus spp., the following merit specific mention: Ctenocephalides canis, Ctenocephalides felis, Pulex irritans, Tunga penetrans, Xenopsylla cheopis;

from the order Heteroptera, e.g. Cimex spp., Triatoma spp., Rhodnius spp. and Panstrongylus spp.;

from the order Blattaria, e.g. Blatta orientalis, Periplaneta americana, Blattella germanica and Supella spp. (e.g. Supella longipalpa);

from the subclass Acari (Acarina) and the orders Meta- and Mesostigmata, e.g. Argas spp., Ornithodorus spp., Otobius spp., Ixodes spp., Amblyomma spp., Rhipicephalus (Boophilus) spp., Dermacentor spp., Haemaphysalis spp., Hyalomma spp., Dermanyssus spp., Rhipicephalus spp. (the original genus of multihost ticks), Ornithonyssus spp., Pneumonyssus spp., Raillietia spp., Sternostoma spp., Varroa spp., Acarapis spp.; specific examples are: Argas persicus, Argas reflexus, Ornithodorus moubata, Otobius megnini, Rhipicephalus (Boophilus) microplus, Rhipicephalus (Boophilus) decoloratus, Rhipicephalus (Boophilus) annulatus, Rhipicephalus (Boophilus) calceratus, Hyalomma anatolicum, Hyalomma aegypticum, Hyalomma marginatum, Hyalomma transiens, Rhipicephalus evertsi, Ixodes ricinus, Ixodes hexagonus, Ixodes canisuga, Ixodes pilosus, Ixodes rubicundus, Ixodes scapularis, Ixodes holocyclus, Haemaphysalis concinna, Haemaphysalis punctata, Haemaphysalis cinnabarina, Haemaphy salis otophila, Haemaphysalis leachi, Haemaphysalis longicorni, Dermacentor marginatus, Dermacentor reticulatus, Dermacentor pictus, Dermacentor albipictus, Dermacentor andersoni, Dermacentor variabilis, Hyalomma mauritanicum, Rhipicephalus sanguineus, Rhipicephalus bursa, Rhipicephalus appendiculatus, Rhipicephalus capensis, Rhipicephalus turanicus, Rhipicephalus zambeziensis, Amblyomma americanum, Amblyomma variegatum, Amblyomma maculatum, Amblyomma hebraeum, Amblyomma cajennense, Dermanyssus gallinae, Ornithonyssus bursa, Ornithonyssus sylviarum, Varroa jacobsoni;

from the order Actinedida (Prostigmata) and Acaridida (Astigmata), e.g. Acarapis spp., Cheyletiella spp., Ornithocheyletia spp., Myobia spp., Psorergates spp., Demodex spp., Trombicula spp., Listrophorus spp., Acarus spp., Tyrophagus spp., Caloglyphus spp., Hypodectes spp., Pterolichus spp., Psoroptes spp., Chorioptes spp., Otodectes spp., Sarcoptes spp., Notoedres spp., Knemidocoptes spp., Cytodites spp., Laminosioptes spp.; specific examples are: Cheyletiella yasguri, Cheyletiella blakei, Demodex canis, Demodex bovis, Demodex ovis, Demodex caprae, Demodex equi, Demodex caballi, Demodex suis, Neotrombicula autumnalis, Neotrombicula desaleri, Neoschongastia xerothermobia, Trombicula akamushi, Otodectes cynotis, Notoedres cati, Sarcoptes canis, Sarcoptes bovis, Sarcoptes ovis, Sarcoptes rupicaprae (=S. caprae), Sarcoptes equi, Sarcoptes suis, Psoroptes ovis, Psoroptes cuniculi, Psoroptes equi, Chorioptes bovis, Psorergates ovis, pneumonyssoidic mange, Pneumonyssoides caninum, Acarapis woodi.

Preferential mention is given to the following ectoparasites: Ctenocephalides spp., Echidnophaga spp., Ceratophyllus spp., Pulex spp., Hyalomma spp., Rhipicephalus spp., Boophilus spp., Amblyomma spp., Haemaphysalis spp., Dermacentor spp., Ixodes spp., Argas spp., Ornithodorus spp., Otobius spp., Otodectes cynotis, Notoedres cati.

The compound of the formula (I) in its crystal forms described herein is suitable for the prophylaxis and treatment of animals with arthropod infestations. The animals include agricultural livestock, for example mammals such as sheep, goats, horses, donkeys, camels, buffalo, rabbits, reindeer, fallow deer and especially cattle and pigs, or poultry such as turkeys, ducks, geese and especially chickens.

The animals also include animals kept as pets, for example mammals such as hamsters, guinea pigs, rats, mice, chinchillas, ferrets and especially dogs and cats; and also caged birds and reptiles.

In a particular embodiment, the compound of the formula (I) is used/administered for the treatment of mammals.

The use of compounds of the formula (I) for the control of animal parasites is intended to reduce or prevent disease, mortality and decreased output (of meat, milk, wool, hides, eggs, honey and the like), thereby enabling more economical and easier animal husbandry and improving the wellbeing of the animals.

For example, it is desirable to prevent a parasite from ingesting blood from a host animal. Parasite control can also help prevent the transmission of infections.

In the present animal health or veterinary medicine context, the term "treatment" encompasses prophylactic, metaphylactic or therapeutic treatment.

The term "control", as used herein for the field of animal health, means that the active substance reduces the parasite count in the infested animal, preferably down to a harmless level. More precisely, "control" means that the active substance kills the parasites concerned, impairs their growth or prevents their reproduction.

The compound of the formula (I) in the crystal forms described herein is used preferably:
for the control of ticks
for the control of fleas
in dogs
in cats.

The compound of the formula (I) in the crystal forms described herein can in principle be administered by the usual routes of administration, with preference given to oral administration.

Modification I of the compound of the formula (I) can also be used in combination with other suitable active substances.

Suitable pharmaceutical forms for the formulation of modification I of the compound of the formula (I) and the production thereof are generally known to those skilled in the art.

When used in animals, the compound of the formula (I) is usually used in amounts of 1 to 100 mg per kg body weight (mg/kg BW), preferably 5 to 30 mg/kg BW, more preferably 10 to 20 mg/kg BW.

The present invention also encompasses any desired combinations of the preferred and particularly preferred embodiments described above.

The invention is elucidated by the following examples but without being restricting thereto.

EXAMPLES

A: Method Examples

The examples that follow elucidate the method of the invention using the structural unit of the formula VI (where -A is 4,4,5,5-tetramethyl-1,3,2-dioxaborolan-2-yl). The synthesis affords a substantially better yield than the known synthesis based on the known structural unit of the formula II.

Example 1

30.0 g of water, 120.0 g of isopropanol and 9.2 g of 2'-methyl-5'-(pentafluoroethyl)-4-(4,4,5,5-tetramethyl-1,3, 2-dioxaborolan-2-yl)-4'-(trifluoromethyl)-2'H-1,3'-bipyrazole (compound of the formula VI where -A is 4,4,5,5-tetramethyl-1,3,2-dioxaborolan-2-yl) were mixed in a reaction vessel. To this was added 6.0 g of 2-chloro-N-(1-cyanocyclopropyl)-5-bromobenzamide (compound of the formula VII where —X is bromine) and 5.0 g of sodium hydrogen carbonate. Finally, 1.16 g of tetrakis(triphenylphosphine)palladium was added and the mixture was heated under reflux for 5 h. The solids present in the reaction mixture were filtered off by suction and washed with 30 g of isopropanol. The filtrate was concentrated slightly to approx. 75% and the distillation residue metered into 200 ml of water. The precipitated solid was filtered off by suction, washed with water and dried under reduced pressure. This afforded 11.3 g of material having a content of 93.2 area %. Without taking into account the content, the calculated yield was—due to the content of secondary components—102.2% of theory; when taking into account the content, it was 95.3% of theory.

Example 2

30.0 g of water, 120.0 g of isopropanol and 9.2 g of 2'-methyl-5'-(pentafluoroethyl)-4-(4,4,5,5-tetramethyl-1,3, 2-dioxaborolan-2-yl)-4'-(trifluoromethyl)-2'H-1,3'-bipyrazole (compound of the formula VI where -A is 4,4,5,5-tetramethyl-1,3,2-dioxaborolan-2-yl) were mixed in a reaction vessel. To this was added 6.9 g of 2-chloro-N-(1-cyanocyclopropyl)-5-iodobenzamide (compound of the formula VII where —X is iodine) and 5.0 g of sodium hydrogen carbonate. Finally, 1.16 g of tetrakis(triphenylphosphine) palladium was added and the mixture was heated under reflux for 5 h. The solids present in the reaction mixture were filtered off by suction and washed with 30 g of isopropanol. The filtrate was concentrated slightly to approx. 75% and the distillation residue metered into 200 ml of water. The precipitated solid was filtered off by suction, washed with water and dried under reduced pressure. This afforded 10.8 g of material having a content of 97.3 area %. Without taking into account the content, the calculated yield was—due to the content of secondary components—97.7% of theory; when taking into account the content, it was 95.1% of theory.

Example 3

150 g of water, 600 g of isopropanol and 46.0 g of 2'-methyl-5'-(pentafluoroethyl)-4-(4,4,5,5-tetramethyl-1,3, 2-dioxaborolan-2-yl)-4'-(trifluoromethyl)-2'H-1,3'-bipyrazole (compound of the formula VI where -A is 4,4,5,5-tetramethyl-1,3,2-dioxaborolan-2-yl) were mixed in a reaction vessel. To this was added 34.7 g of 2-chloro-N-(1-cyanocyclopropyl)-5-iodobenzamide (compound of the formula VII where —X is iodine) and 25.20 g of sodium hydrogen carbonate. Finally, 1.44 g of tetrakis(triphenylphosphine)palladium was added and the mixture was heated under reflux for 3.5 h. The solid present in the reaction mixture was filtered off by suction and washed with 100 g of isopropanol. The filtrate was concentrated slightly to approx. 50% and the distillation residue cooled to RT. 1000 ml of water was metered into the cooled residue. The precipitated solid was filtered off by suction, washed with water and dried under reduced pressure. This afforded 54.6 g of material having a content of 98.7 area %. Without taking into account the content, the calculated yield was—due to the content of secondary components—98.8% of theory; when taking into account the content, it was 97.5% of theory.

Example 4

10.6 g of the product obtained in the previous example was dissolved hot in 94.4 g of toluene in a reaction vessel. The solution was cooled while stirring and the solid filtered off by suction, washed with toluene and dried under reduced pressure. This afforded 8.9 g of material in (84.0% based on starting material used), which had a content of 99.4 area % and a palladium content of under 100 ppm.

Example 5

37.5 g of water, 150 g of isopropanol and 11.5 g of 2'-methyl-5'-(pentafluoroethyl)-4-(4,4,5,5-tetramethyl-1,3, 2-dioxaborolan-2-yl)-4'-(trifluoromethyl)-2'H-1,3'-bipyrazole (compound of the formula VI where -A is 4,4,5,5-tetramethyl-1,3,2-dioxaborolan-2-yl) were mixed in a reaction vessel. To this was added 0.16 g of triphenylphosphine, 8.7 g of 2-chloro-N-(1-cyanocyclopropyl)-5-iodobenzamide (compound of the formula VII where —X is iodine) and 6.3 g of sodium hydrogen carbonate. Finally, 0.2 g of tetrakis(triphenylphosphine)palladium was added and the mixture was heated under reflux for 5 h. The mixture was cooled and the solid present was removed by filtration and washed with a little isopropanol. 250 ml of water was metered into the pooled filtrate and the precipitated solid was filtered off and washed with water. The damp product was mixed with approx. 44 g of toluene and stirred at 70-75° C. for 1 h. The suspension was cooled to RT and the solid filtered off by suction, washed with toluene and dried. This afforded 12.3 g (89.0% of theory) of a slightly yellowish solid having a content of >99 area % (area percent from HPLC chromatogram). The palladium content was under 50 ppm.

Example 6

In a reaction vessel, 11.1 g of the product obtained in the previous example was mixed with 198 g of toluene and 0.5 g of activated carbon and dissolved hot under reflux. The activated carbon was filtered off hot and the filtrate obtained was concentrated to approx. 40%. This was cooled while stirring and the solid obtained was filtered off, washed with toluene and dried under reduced pressure. This afforded 10.0 g (90.1% based on starting material used) of a colourless, finely crystalline powder having a content of >99.8 area % (area percent from HPLC chromatogram). None of the secondary components were present in a content above 0.10 area %. The palladium content was under 10 ppm.

The product prepared in example 6 was investigated by TGA. This showed no loss of mass up to 150° C.

The product prepared in example 6 was analysed by X-ray powder diffractometry (measurement conditions as specified hereinbelow). The product had crystallized in modification I, which is described in detail hereinbelow. The diffractogram of the product from example 6 is shown in FIG. 1.

Example 7

37.5 g of water, 150 g of isopropanol and 11.5 g of 2'-methyl-5'-(pentafluoroethyl)-4-(4,4,5,5-tetramethyl-1,3, 2-dioxaborolan-2-yl)-4'-(trifluoromethyl)-2'H-1,3'-bipyrazole (compound of the formula VI where -A is 4,4,5,5-tetramethyl-1,3,2-dioxaborolan-2-yl) were mixed in a reaction vessel. To this was added 0.16 g of triphenylphosphine, 8.7 g of 2-chloro-N-(1-cyanocyclopropyl)-5-iodobenzamide (compound of the formula VII where —X is iodine) and 6.3 g of sodium hydrogen carbonate. Finally, 0.2 g of tetrakis(triphenylphosphine)palladium was added and the mixture was heated under reflux for 5 h. The mixture was cooled and the solid present was removed by filtration and washed with 1.8 g of isopropanol. 250 ml of water was metered into the pooled filtrate and the precipitated solid was filtered off, washed with water and dried under reduced pressure. A 2.0 g reserve sample of the water-damp product was taken and dried. This afforded 1.1 g of material (8.0% of theory). The rest of the water-damp product was suspended in 300 g of toluene and the water was removed by azeotropic distillation. Activated carbon was then added and the mixture was stirred under reflux and filtered hot. Approx. 60% of the solvent was distilled from the clear filtrate and the residue left behind was cooled. The precipitated solid in the mixture was filtered off by suction, washed with toluene and dried under reduced pressure. This afforded 10.8 g of a crystalline solid (78.2% of theory). The analytical content of was 99.6 area % (area percent from HPLC chromatogram). The largest secondary component was present in 0.11%. The palladium content was less than 100 ppm.

Example 8

A reaction vessel was charged with 25.1 g of a crude product prepared in analogous manner to example 5. To this was added 195.5 g of toluene, 80.0 g of acetone and 1.26 g of activated carbon. The crude product was dissolved hot under reflux. The activated carbon was filtered off hot and the filtrate obtained was concentrated by distillation at standard pressure to a residue of approx. 167 g. This was cooled (<approx. 54° C.) while stirring until crystallization was largely complete. The suspension was heated to an internal temperature of approx. 95° C. and stirred briefly at this temperature without allowing complete dissolution to occur. The resulting hot suspension was cooled slowly to 5° C., stirred further at this temperature and the solid obtained was filtered off, washed with toluene and dried under reduced pressure. This afforded 23.7 g (94.4% based on starting material used) of a colourless, finely crystalline powder having a content of >99.8 area % (area percent from HPLC chromatogram). None of the secondary components were present in a content above 0.10 area %. The palladium content was under 1 ppm.

Example 9

Preparation of the structural unit of the formula C (corresponding to the structural unit of the formula VI where -A is 4,4,5,5-tetramethyl-1,3,2-dioxaborolan-2-yl).

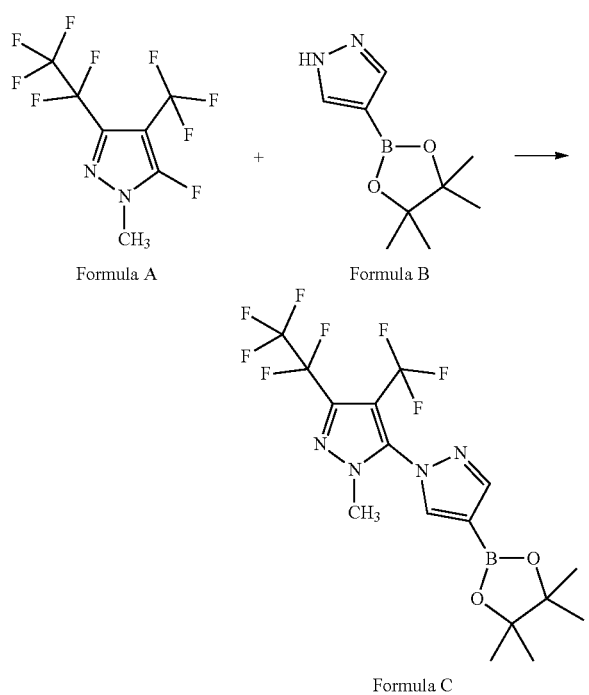

Formula A  Formula B

Formula C 2.6 kg of structural unit B and 22.88 litres of acetonitrile were mixed at 22° C. in a reaction vessel. To this was added 2.78 kg of ground potassium carbonate, 3.64 kg of the structural unit of the formula A and 1.91 kg of acetonitrile. The reaction mixture was stirred under reflux for 7 hours and then cooled to RT. The solid in the reaction mixture was filtered off and washed with 4.03 kg of acetonitrile. 23.75 kg of solvent was distilled from the pooled filtrate. The distillation residue was mixed with 7.53 kg of isopropanol, after which 47.85 kg of water was metered in at approx. 22° C., the mixture was cooled to 3-5° C. and the precipitated solid was filtered off. The solid was washed with water and dried under reduced pressure. This afforded 4.99 kg of the product of the formula C as a light yellow solid. This was equivalent to 85.2% of theory. The analytical content was 99.6% ESTD (HPLC evaluation with external standard).

B. Crystal Forms of the Compound of the Formula (I)

B.1. Preparation of Modification I

Approx. 400 mg of the compound of the formula (I) was in each case dissolved hot in the specified volume of one of the solvents specified below and filtered hot:

80 ml of diisopropyl ether+5 ml of ethanol
40 ml of toluene
40 ml of tetrahydrofuran
40 ml of acetone
40 ml of ethyl acetate
40 ml of acetonitrile
40 ml of 2-propanol
40 ml of ethanol
40 ml of methanol
40 ml of 1,4-dioxane
40 ml of DMSO The solutions were allowed to stand at room temperature until dryness. Modification I was characterized by X-ray diffractometry.

B.2. Preparation of Modification II

Approx. 400 mg of the compound of the formula (I) was dissolved hot in 4 ml of solketal. The solutions were allowed to stand at room temperature until dryness. Modification II was characterized by X-ray diffractometry.

B.3. Preparation of the Ethanol-Water Inclusion Complex

Approx. 400 mg of the compound of the formula (I) was dissolved hot in 100 ml of EtOH/$H_2O$ 1:1 and filtered hot. The solution was allowed to stand until dryness. The ethanol-water inclusion complex was characterized by X-ray diffractometry.

B.4. Characterization of the Crystal Forms

TABLE 1

XRPD data for crystal forms of the compound of the formula (I)
Reflection positions (signal maxima) [°2 theta]

| Mod. I | Mod. II | Ethanol-water inclusion complex |
|---|---|---|
| 5.6 | 5.5 | 5.6 |
| 8.1 | 7.8 | 8.1 |
| 8.7 | 9.5 | 8.7 |
| 9.6 | 11.0 | 9.6 |
| 10.4 | 12.3 | 9.7 |
| 11.2 | 14.1 | 10.4 |
| 12.2 | 14.6 | 10.5 |
| 12.7 | 16.1 | 11.2 |
| 14.1 | 16.6 | 12.4 |
| 14.5 | 17.5 | 12.7 |
| 15.2 | 18.4 | 14.1 |
| 15.9 | 19.6 | 14.3 |
| 16.8 | 21.8 | 14.4 |
| 17.7 | 22.5 | 15.2 |
| 18.2 | 23.5 | 15.9 |
| 18.6 | 23.8 | 16.8 |
| 18.8 | 24.8 | 17.6 |
| 19.1 | 25.1 | 18.0 |
| 19.3 | 26.4 | 18.2 |
| 19.7 | 27.8 | 18.4 |
| 20.0 | 28.4 | 18.6 |
| 20.8 | 28.9 | 18.8 |
| 21.1 | 30.0 | 19.1 |
| 21.7 | 30.8 | 19.3 |
| 22.0 | 31.9 | 19.7 |
| 22.5 | 33.2 | 20.0 |
| 22.8 | 35.9 | 20.8 |
| 23.0 |  | 21.1 |
| 23.5 |  | 21.5 |
| 23.8 |  | 21.6 |
| 24.3 |  | 22.0 |
| 24.6 |  | 22.5 |
| 24.9 |  | 22.8 |
| 25.2 |  | 23.0 |
| 25.4 |  | 23.5 |
| 25.5 |  | 23.8 |
| 26.2 |  | 24.3 |
| 26.4 |  | 24.6 |
| 26.5 |  | 24.9 |
| 27.1 |  | 25.3 |
| 27.7 |  | 25.5 |
| 29.2 |  | 26.2 |
| 29.8 |  | 26.4 |
| 30.3 |  | 26.6 |
| 31.0 |  | 26.8 |

TABLE 1-continued

XRPD data for crystal forms of the compound of the formula (I)
Reflection positions (signal maxima) [°2 theta]

| Mod. I | Mod. II | Ethanol-water inclusion complex |
|---|---|---|
| 31.4 | | 27.0 |
| 32.7 | | 27.6 |
| 35.2 | | 28.0 |
| | | 28.8 |
| | | 29.1 |
| | | 29.5 |
| | | 29.8 |
| | | 30.9 |
| | | 31.0 |
| | | 31.8 |
| | | 32.5 |
| | | 32.8 |
| | | 35.3 |
| | | 35.7 |
| | | 36.2 |
| | | 36.5 |
| | | 36.8 |

MEASUREMENT CONDITIONS

| Anode material | Cu |
|---|---|
| K-Alpha1 [Å] | 1.54060 |
| Generator | 40 mA, 40 kV |
| Sample rotation | Yes |
| Scan-axis | Gonio |
| Start position [°2theta] | 2.0066 |
| End position [°2theta] | 37.9906 |

FIG. 1: X-ray powder diffractogram of modification I
FIG. 2: X-ray powder diffractogram of modification II
FIG. 3: X-ray powder diffractogram of the ethanol-water inclusion complex
FIG. 4: X-ray powder diffractogram of the amorphous form

TABLE 2

IR spectroscopic data of the crystal forms of the compound of the formula (I)
Bands [signal maxima in $cm^{-1}$]

| Mod. I | Mod. II | Ethanol-water inclusion complex | Amorphous form |
|---|---|---|---|
| 3249 | 3274 | 3252 | 3420 |
| 3120 | 3123 | 3119 | 3278 |
| 3019 | 3019 | 3097 | 3211 |
| 1660 | 1662 | 1730 | 3186 |
| 1599 | 1593 | 1661 | 2995 |
| 1562 | 1559 | 1600 | 2948 |
| 1509 | 1540 | 1585 | 2915 |
| 1474 | 1506 | 1561 | 1617 |
| 1430 | 1472 | 1509 | 1604 |
| 1399 | 1429 | 1473 | 1576 |
| 1375 | 1395 | 1429 | 1545 |
| 1341 | 1374 | 1394 | 1519 |
| 1308 | 1339 | 1374 | 1501 |
| 1276 | 1303 | 1343 | 1463 |
| 1255 | 1251 | 1307 | 1445 |
| 1218 | 1217 | 1275 | 1419 |
| 1180 | 1178 | 1255 | 1382 |
| 1145 | 1142 | 1218 | 1347 |
| 1099 | 1097 | 1205 | 1304 |
| 1060 | 1059 | 1187 | 1284 |
| 1053 | 1025 | 1137 | 1240 |
| 1027 | 991 | 1099 | 1226 |
| 993 | 966 | 1080 | 1200 |
| 968 | 941 | 1060 | 1180 |
| 943 | 897 | 1052 | 1169 |
| 899 | 866 | 1027 | 1143 |
| 864 | 837 | 992 | 1128 |
| 839 | 819 | 968 | 1089 |
| 821 | 802 | 943 | 1069 |
| 804 | 782 | 899 | 1047 |
| 184 | 769 | 865 | 1036 |
| 772 | 745 | 839 | 997 |
| 760 | 731 | 821 | 940 |
| 745 | 719 | 803 | 923 |
| 731 | 695 | 784 | 874 |
| 698 | 667 | 771 | 854 |
| 667 | 660 | 745 | 808 |
| 660 | 635 | 731 | 788 |
| 636 | 626 | 720 | 753 |
| 626 | 591 | 697 | 744 |
| 592 | 570 | 681 | 726 |
| 572 | 564 | 667 | 721 |
| 564 | 557 | 659 | 685 |
| 557 | | 636 | 659 |
| | | 626 | 609 |
| | | 604 | 580 |
| | | 592 | 563 |
| | | 573 | |
| | | 564 | |
| | | 557 | |

Measurement conditions:

ATR IR spectra were recorded at room temperature in a Tensor 37 FT-IR spectrophotometer from Bruker using an ATR unit and without further sample preparation. The resolution was 4 $cm^{-1}$.

Figure 5:
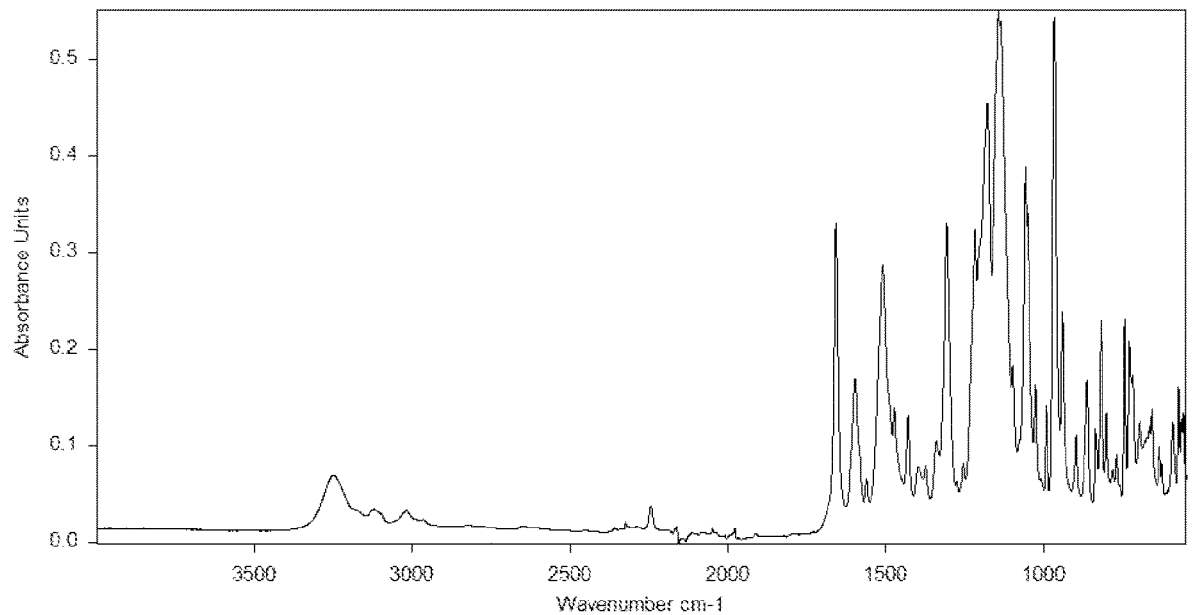

The spectra are shown in the figures:

FIG. 5: IR spectrum of modification I

Figure 6:
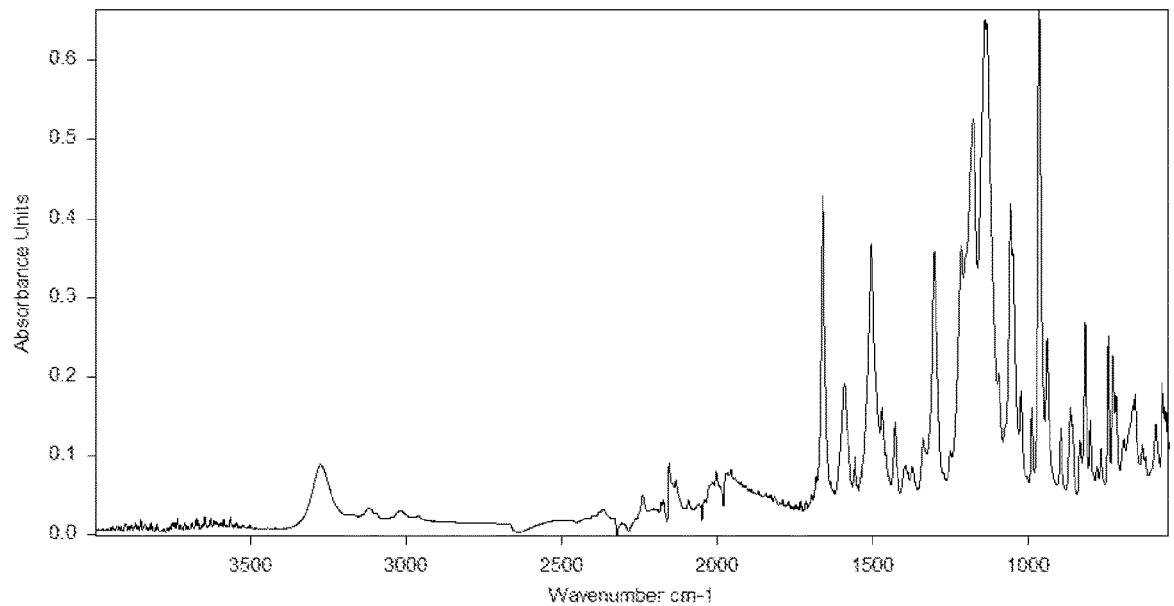

FIG. 6: IR spectrum of modification II

Figure 7:
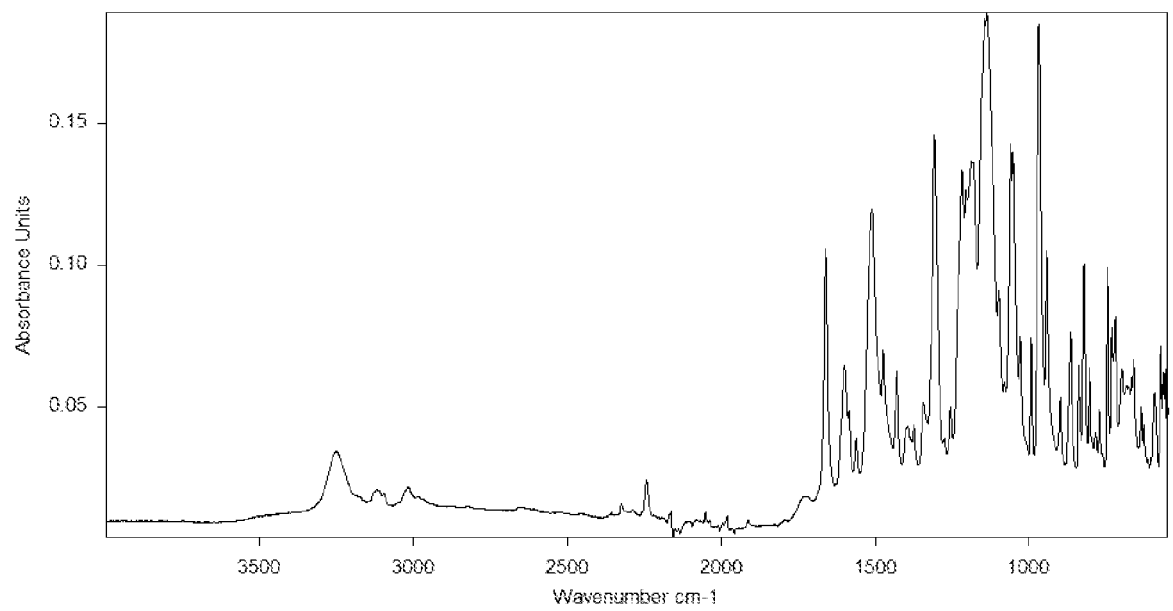

FIG. 7: IR spectrum of the ethanol-water inclusion complex

Figure 8:
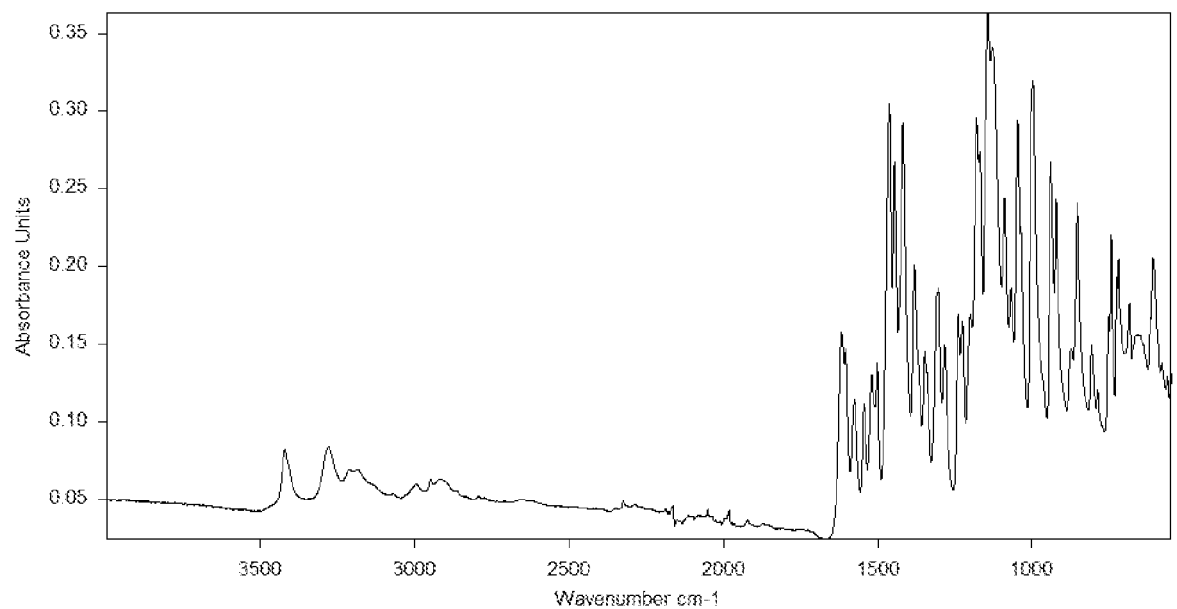

FIG. 8: IR spectrum of the amorphous phase

The invention claimed is:

1. A method for preparing a compound of formula (I)

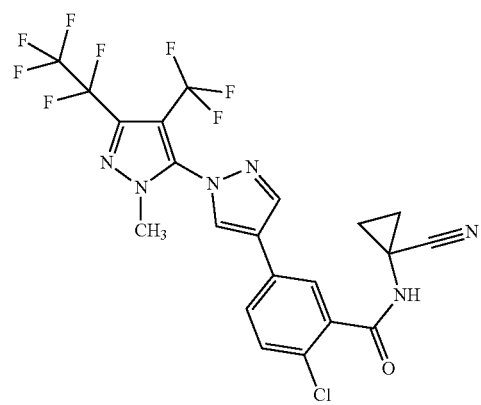

by reacting a compound of formula (VI)

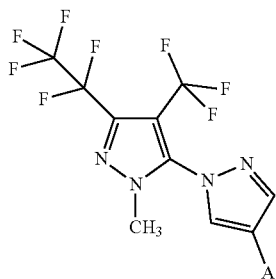

where
A is a boron-containing substituent selected from the group consisting of:
a boronic acid radical of the formula

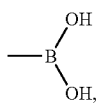

a trifluoroborate of the formula $-BF_3M$, where M is an alkali metal salt,
and a boronic ester of the formula

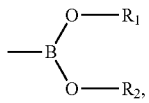

where $R^1$ and $R^2$ are independently $C_1$-$C_6$ alkyl or $C_3$-$C_6$ cycloalkyl, or $R^1$ and $R^2$ together form a $C_1$-$C_6$ alkylene group optionally substituted by one or more $C_1$-$C_4$ alkyl groups,
with a compound of formula (VII)

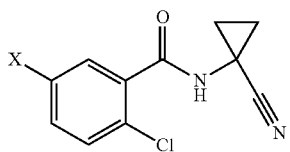

where X is a reactive group selected from: bromine, iodine and a radical —O—SO$_2$—Y, where Y is $C_1$-$C_8$ perfluoroalkyl,
in the presence of a base and a catalyst,
wherein compound VI is used in amounts of 0.7 to 1.3 equivalents based on the structural unit of the formula VII;
wherein the base[s] used are alkali metal carbonates, alkaline earth metal carbonates, alkali metal hydrogen carbonates, alkaline earth metal hydrogen carbonates, alkali metal phosphates, alkaline earth metal phosphates, alkali metal fluorides, or mixtures thereof and is used in an amount of 1 to 10 equivalents based on the starting material of the formula VI.

2. The method according to claim 1, wherein $R^1$ and $R^2$ together form a $C_1$-$C_6$ alkylene group substituted by one or more $C_1$-$C_2$ alkyl groups.

3. The method according to claim 1, wherein X is bromine or iodine.

4. The method according to claim 1, wherein the reacting further occurs in the presence of a solvent, wherein the solvent used is dimethylformamide, dimethylacetamide, N-methylpyrrolidone, open-chain or cyclic ethers, or a $C_1$-$C_6$ alkyl-derived alcohol.

5. The method according to claim 1, wherein the catalyst comprises a palladium-containing component.

6. The method according to claim 5, wherein the catalyst additionally comprises a phosphorus-containing component.

7. The method according to claim 1, wherein the base is used in an amount of 2 to 5 equivalents based on the starting material of formula VI.

8. A method for purifying the compound of formula I, wherein the compound is the crystallized form of a compound of formula (I) modification I, the method comprising: crystallizing the compound from an aromatic hydrocarbon, wherein the aromatic hydrocarbon is selected from the group consisting of toluene, ethylbenzene, ortho-xylene, meta-xylene, and para-xylene.

9. The method according to claim 1, wherein a method of purification is executed subsequently to the reaction.

10. A crystalline form of a compound of formula (I) modification I.

11. The method according to claim 1, where M is sodium or potassium.

12. The method according to claim 1, wherein the base is used in an amount of 2.5 to 3.5 equivalents.

13. The method according to claim 4, wherein the solvent is a $C_1$-$C_4$ alkyl-derived alcohol.

* * * * *